Patented Feb. 5, 1924.

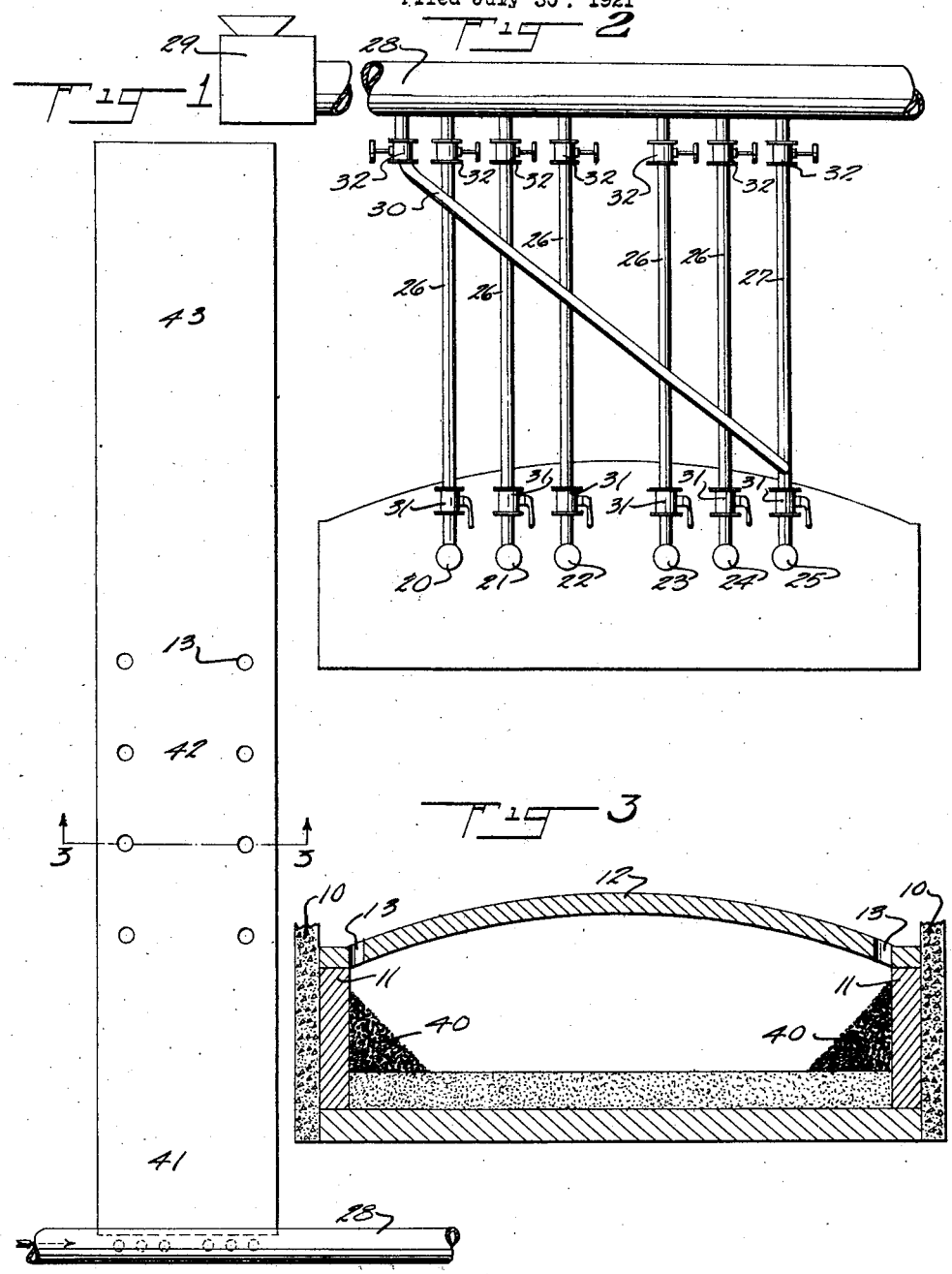

1,482,549

UNITED STATES PATENT OFFICE.

HENRY F. EASTER, OF HAYDEN, ARIZONA, ASSIGNOR TO AMERICAN SMELTING AND REFINING COMPANY, OF NEW YORK, N. Y., A CORPORATION OF NEW JERSEY.

DISTRIBUTION OF FUEL.

Application filed July 30, 1921. Serial No. 488,662.

*To all whom it may concern:*

Be it known that I, HENRY F. EASTER, a citizen of the United States, and resident of Hayden, in the county of Gila and State of Arizona, have invented certain new and useful Improvements in the Distribution of Fuel, of which the following is a specification.

This invention relates to the smelting of ores and to furnaces therefor, such as reverberatory furnaces and the like.

Broadly stated, the object of the present invention is to supply the fuel to such furnaces so as to increase the temperatures of certain portions thereof; and more particularly to supply the fuel to the furnace under a pressure higher along the sides of the furnace with relatively less pressures at intermediate points.

Another object of the invention is substantially to equalize the temperatures in two zones or regions of a side-feed reverberatory furnace adjacent the material to be treated.

Various other objects and advantages of the invention will be obvious from the following particular description of one method of carrying out the invention and from actual practice of the invention as herein after set forth.

My improved process consists essentially in equalizing the temperature on both sides of a smelting furnace adjacent the walls thereof, and preferably adjacent embankments of ore or material to be treated which may be supplied to the interior of the furnace through suitable openings provided in the roof in the usual manner. Fuel is supplied to the furnace in such manner and in quantity sufficient to produce foci of maximum temperatures adjacent the material under treatment, thereby establishing regions or zones of higher temperature within the furnace itself. Preferably the fuel is supplied under pressure, which may be suitably controlled.

Referring to the accompanying drawings illustrating one form of apparatus adapted to carry out my process, Figure 1 shows a plan view of a furnace;

Figure 2 shows the system of piping for the fuel for the burners; and

Figure 3 shows a section of a furnace on the line 3—3 of Figure 1.

In said drawings 10, 10 designate the walls of the furnace which may be substantially braced by cross-rods (not shown), and which enclose the hearth 11 and support the roof 12. A plurality of feeding openings, as 13, are provided in the roof adjacent to the side walls, whereby the ore or other material to be treated can be put into the furnace. One end of the furnace is provided with a plurality of burners 20, 21, 22, 23, 24 and 25. Each of these burners is connected by a supply pipe, such as 26, 27, with a main supply pipe 28, which communicates with a source of fuel 29 (shown diagrammatically).

From a point on the pipe 28 between the fuel supply 29 and the first feed pipe 26, extends a diagonal supply pipe 30 terminating at the lower portion of the last supply pipe 27. Near each burner 20, 21, etc., is a usual butterfly valve 31, or other means for adjusting the quantity of fuel supplied through the burner. At the upper portion of each of the supply pipes 26 to 30, is a gate valve 32, whereby the supply of fuel may be shut off when it is desired to close down the furnace.

In operation, the ore or material to be smelted is fed through the openings 13 and forms a sloping embankment, indicated at 40, on each side of the furnace. As it becomes fused under the action of the heat, it gradually settles down the incline, and fresh ore or other material is supplied through the openings in the usual manner. A suitably proportioned mixture of fuel passes under pressure through the supply pipe 28 in the direction indicated by the arrow. With valves 31 and 32 open, fuel is forced through the supply pipe, and through the burners, producing the heat necessary for smelting. Preferably pulverized coal or fuel oil is used as a fuel, but other liquid or pulverized or mixtures of fuel may be used as desired.

Owing to the arrangement of the several burners, the fuel is forced into the furnace under a higher pressure adjacent the sides of the furnace with a lower pressure in the intermediate or central part of the furnace. Consequently a zone or region of higher temperature is created adjacent the embankment of ore or other material lying against the sides of the furnace, these two zones being the foci of maximum temperature in the furnace and determining the heat energy of the furnace and controlling to a considerable extent the rate of smelting.

In practice, these zones of maximum temperature have been demonstrated to be of great importance in their effect upon both fuel tonnage and fuel consumption. Compared with the operations under the usual methods heretofore employed, a furnace operated according to my improved process gave an increased tonnage of approximately ten per cent. The rate of smelting is under better control, and both sides of the furnace operate equally, thus securing the maximum results from a given quantity of fuel.

Although I have described and have pointed out in the annexed claims certain novel features of my invention, it will be understood that various omissions, substitutions and changes in the several steps of my process and in its operation may be made by those skilled in the art without departing from the spirit of the invention.

Having described my invention, what I claim is:

1. The method of smelting ore in a reverberatory furnace which consists in introducing ore adjacent the side walls of the furnace to form sloping embankments, and feeding pulverized fuel thereto under pressure in quantity greater adjacent the embankments.

2. In a metallurgical furnace, the process which consists in introducing ore adjacent the side walls of the furnace to form sloping embankments, and feeding pulverized fuel to the furnace between said embankments, the quantity of fuel being in excess adjacent said embankments.

3. The method of smelting ore in a reverberatory furnace which consists in introducing material to be treated adjacent the side walls of the furnace to form sloping embankments, and feeding pulverized fuel to the furnace between said embankments, the quantity of fuel being greater at the sides to form foci of temperature adjacent the embankments and being less intermediate said foci of temperature.

4. The method of smelting material in a reverberatory furnace which consists in supplying fuel to the furnace adjacent the side walls at pressures greater than supplied to the intermediate portion of the furnace so as to produce a higher temperature near the walls than in the intermediate portion of the furnace.

5. The process of treating material in a reverberatory furnace which consists in supplying fuel at greater pressures to the portion adjacent the side walls than to the intermediate portion and substantially equalizing the temperatures adjacent the side walls of the furnace to provide regions of maximum temperature and creating a slightly lower temperature intermediate said regions of maximum temperature.

6. The method of smelting material in a reverberatory furnace which consists in supplying fuel to the furnace under pressure that is higher adjacent the side walls and lower in the central longitudinal portion of the furnace.

7. The process of treating material in a reverberatory furnace which consists in supplying fuel from burners to the interior of the furnace under pressure providing a higher pressure for the burners adjacent the side walls of the furnace and providing a lower pressure for the burners in the central portion of the furnace, thereby to create a region of maximum temperature adjacent the side walls of the furnace.

8. In a metallurgical furnace, a plurality of openings in the roof along the sides thereof, a main fuel supply pipe positioned at one end thereof, a plurality of burners arranged in groups across one end of the furnace, a branch supply pipe for each of certain of said burners coupled to said main pipe in the same order as the respective burners, and a branch supply pipe for at least one other of said plurality of burners coupled to said main pipe out of regular order.

9. In a metallurgical furnace, a plurality of burners at one end of said furnace, a source of fuel for said burners and means for transferring fuel from said source to said burners comprising a main line and branches connecting said main line and each of said burners, a portion of said branches being coupled to said main line in the same order as the respective burners, and at least one of said branches being coupled thereto in a different order.

10. In a smelting furnace, a plurality of burners for heating the furnace, a branch pipe for each of said burners for conducting fuel thereto, a main line fuel pipe for supplying fuel to a portion of said pipes in the order of location of said burners and an additional branch pipe to supply fuel to one of said pipes in a different order.

11. The combination of a metallurgical furnace having a plurality of burners positioned therein, a main fuel pressure supply pipe common to said burners, branch supply pipes extending from said burners to points of said main pipe spaced apart and subject to successively decreasing pressures, and a connection from the last of said burners to a point in the main pipe subject to a pressure greater than any of said pressures.

12. The combination of a metallurgical furnace having a plurality of burners positioned therein, a main fuel pressure supply pipe common to said burners, branch supply pipes extending from said burners to points of said main pipe spaced apart and subject to successively decreasing pressures, the pressures on the pipes leading to burners on one side of the furnace being less than the pressures on the pipes leading to burners on the other side, and a connection from the branch supply pipe subject to the least pressure to a point in the main pipe subject to a pressure greater than any of said pressures.

Signed at Tacoma, in the county of Pierce and State of Washington this 18th day of July, A. D. 1921.

HENRY F. EASTER.